(12) United States Patent
Abdourazak et al.

(10) Patent No.: US 9,279,032 B2
(45) Date of Patent: Mar. 8, 2016

(54) LOW TEMPERATURE CURABLE EPOXY COMPOSITIONS

(75) Inventors: Atteye Houssein Abdourazak, Allentown, PA (US); Gamini Ananda Vedage, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 158 days.

(21) Appl. No.: 13/075,403

(22) Filed: Mar. 30, 2011

(65) Prior Publication Data
US 2012/0077943 A1 Mar. 29, 2012

Related U.S. Application Data

(60) Provisional application No. 61/378,995, filed on Sep. 1, 2010.

(51) Int. Cl.
| | |
|---|---|
| C08G 59/00 | (2006.01) |
| C08G 59/50 | (2006.01) |
| C08G 59/62 | (2006.01) |
| C08L 63/00 | (2006.01) |
| C08G 59/18 | (2006.01) |

(52) U.S. Cl.
CPC ............ *C08G 59/502* (2013.01); *C08G 59/182* (2013.01); *C08G 59/504* (2013.01); *C08G 59/621* (2013.01); *C08G 59/623* (2013.01); *C08L 63/00* (2013.01)

(58) Field of Classification Search
USPC ....................................................... 523/417
See application file for complete search history.

(56) References Cited

U.S. PATENT DOCUMENTS

| | | | | |
|---|---|---|---|---|
| 4,689,390 | A * | 8/1987 | Suzuki et al. ................. | 528/118 |
| 4,977,201 | A | 12/1990 | Ogawa et al. | |
| 5,200,494 | A | 4/1993 | Kubota et al. | |
| 6,492,437 | B1 | 12/2002 | Musa et al. | |
| 7,611,772 | B2 * | 11/2009 | Barancyk et al. ........... | 428/423.1 |
| 2008/0188591 | A1 | 8/2008 | Raymond et al. | |
| 2008/0194776 | A1 * | 8/2008 | Walker et al. ................. | 525/523 |
| 2009/0029175 | A1 * | 1/2009 | Vedage et al. ................ | 428/418 |
| 2010/0119838 | A1 * | 5/2010 | Walker et al. ................. | 428/418 |
| 2011/0065837 | A1 | 3/2011 | Vedage et al. | |
| 2011/0095453 | A1 * | 4/2011 | Ogawa et al. ................. | 264/319 |

FOREIGN PATENT DOCUMENTS

| | | |
|---|---|---|
| EP | 0 197 458 A2 | 10/1986 |
| EP | 0 590 677 A1 | 4/1994 |
| EP | 0 748 855 A1 | 12/1996 |
| EP | 1 956 034 A1 | 8/2008 |
| EP | 2 108 668 A1 | 10/2009 |
| JP | 05230184 | 9/1993 |
| JP | 2008-248227 | 10/2008 |
| JP | 2010-006991 | 1/2010 |
| JP | 2011-057984 | 3/2011 |
| WO | WO 2009/157147 | * 12/2009 |

OTHER PUBLICATIONS

Tanaka, T.,; Synthesis and Characteristics of Epoxides; C.A. May, ed; Expoxy Resins Chemistry and Technology (Marcel Dekker); 1988.

* cited by examiner

*Primary Examiner* — Robert C Boyle
(74) *Attorney, Agent, or Firm* — Michael K. Boyer

(57) ABSTRACT

A heat curable epoxy composition comprising the contact product of an epoxy resin, an epoxy curing agent and an accelerator for the epoxy curing agent, the curing agent or the accelerator comprising the reaction product of (a) a phenolic resin (a) of general formula:

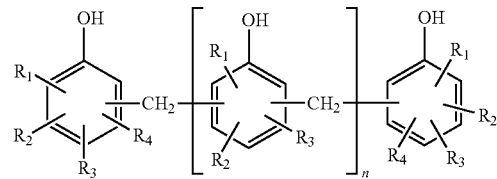

Where R1, R2, R3, R4 are each independently of one another a hydrogen or unbranched or branched alky group having 1 to 17 carbon atoms, and n is an integer form 0 to 50; and (b) a modified amine compound which is the reaction product of an epoxy resin and a methylated polyalkylenepolyamine having one primary or secondary amine and at least two tertiary amines of the general formula:

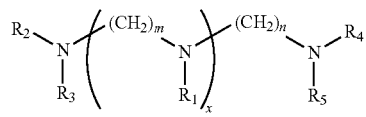

Where R1, R2, R3, R4 and R5 represent hydrogen, methyl or ethyl; n and m independently are integers from 1 to 10 and; X is an integer from 1 to 10.

17 Claims, No Drawings

LOW TEMPERATURE CURABLE EPOXY COMPOSITIONS

CROSS-REFERENCE TO RELATED APPLICATIONS

This application claims the benefit of Provisional U.S. Patent Application Ser. No. 61/378,995, filed on Sep. 1, 2010, the disclosure of which is incorporated herein by reference in its entirety.

BACKGROUND OF THE INVENTION

The subject matter of this invention relates to methylated polyalkylenepolyamines having one primary or secondary amines and at least two tertiary amines epoxy adducts, and blocked with phenolic resin as curing agents or accelerators in heat cured epoxy resins. These compositions can provide low activation temperature and good shelf stability as curing agents or accelerators in epoxy resin systems.

Conventional curable epoxy compositions are described in U.S. Pat. Nos. 4,689,390; 4,977,201; 5,200,494 and EP 0 590 677; the disclosure of the foregoing is hereby incorporated by reference. There is a need in the heat cured epoxy art for accelerators and curing agents that provide low activation temperature, good shelf stability. The inventive methylated polyalkylenepolyamines having one primary or secondary amines and at least two tertiary amines epoxy adducts, and blocked with phenolic resin were found to provide low temperature cure, and good storage stability and mechanical strength in epoxy systems.

BRIEF SUMMARY OF THE INVENTION

The instant invention solves problems associated with conventional epoxy curing agents by providing an accelerator or a curing agent comprising a contact or reaction product of: (a) a phenolic resin, and (b) a modified amine compound which is the reaction product of an epoxy resin and a methylated polyalkylenepolyamine having one primary or secondary amine and at least two tertiary amines of the general formula:

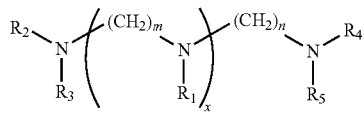

Where R1, R2, R3, R4 and R5 represent hydrogen, methyl or ethyl; n and m independently are integers from 1 to 10 and; X is an integer from 1 to 10.
(a) a phenolic resin of general formula (A)

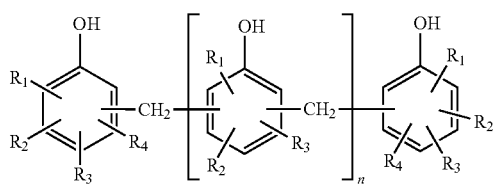

Where R1, R2, R3, R4 are each independently of one another a hydrogen or unbranched or branched alky group having 1 to 17 carbon atoms, and n is an integer form 0 to 50.

In one aspect of the invention, the methylated polyalkylenepolyamine comprises a compound wherein $R_1$ is H, $R_{2,3,4}$ and $_5$ are $CH_3$, n and m are 3 and X is 1.

DETAILED DESCRIPTION OF THE INVENTION

The instant invention relates broadly to compounds and compositions for use in crosslinking or curing epoxy containing systems. The inventive accelerators or curing agents can comprise the contact product of an epoxy resin, an epoxy curing agent and, if desired, an accelerator for the epoxy curing agent, the curing agent or the accelerator comprising the reaction product of (a) a phenolic resin (a) of general formula:

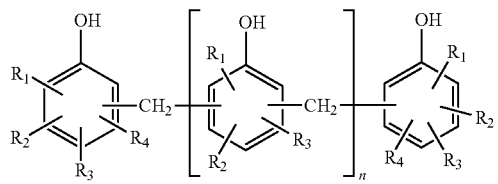

Where R1, R2, R3, R4 are each independently of one another a hydrogen or unbranched or branched alky group having 1 to 17 carbon atoms, and n is an integer form 0 to 50; and (b) a modified amine compound which is the reaction product of an epoxy resin and a methylated polyalkylenepolyamine having one primary or secondary amine and at least two tertiary amines of the general formula:

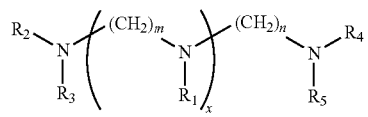

Where R1, R2, R3, R4 and R5 represent hydrogen, methyl or ethyl; n and m independently are integers from 1 to 10 and; X is an integer from 1 to 10.

In one aspect of the invention, the methylated polyalkylenepolyamine comprises a compound wherein $R_1$ is H, $R_{2,3,4}$ and $_5$ are $CH_3$, n and m are 3 and X is 1.

In another aspect of the invention, the phenolic resin is a novolac resin, a compound formed by the condensation of a phenol with an aldehyde, especially formaldehyde. Novolac resins are the reaction product of a mono or dialdehyde, most usually formaldehyde, with a mono or polyphenolic material. Examples of monophenolic materials which may be utilized include phenol, the cresols, p-tert-butylphenol, nonylphenol, octylphenol, other alkyl and phenyl substituted phenols. Polyphenolic materials include the various diphenols including bisphenol-A and bisphenol-F. Aldehydes which are utilized for the novolac include formaldehyde, glyoxal, and the higher aldehydes up to about C4. The novolacs typically are complex mixtures with different degrees of hydroxyl functionality.

The term "contact product" or "reaction product" as used herein describes compositions wherein the components are contacted together in any order, in any manner, and for any length of time including the possibility that two or more of the components may react with each other yielding other components. For example, the components can be contacted by blending or mixing. Further, contacting of any component can occur in the presence or absence of any other component of the compositions or formulations described herein. Combining additional materials or components can be done by any method known to one of skill in the art. Further, the term "contact product" includes mixtures, blends, solutions, dispersions, slurries, reaction products, and the like, or combinations thereof.

The inventive accelerators and curing agents can be employed for crosslinking or curing any suitable epoxy containing system. Examples of suitable epoxy resins that can be cured by the inventive curing agent comprises at least one multifunctional epoxy resin. Multifunctional epoxy resin, as used herein, describes compounds containing 2 or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference.

One class of epoxy resins suitable for use in the present invention comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), and the like, or any combination thereof. Additionally, advanced dihydric phenols of the following structure also are useful in the present invention:

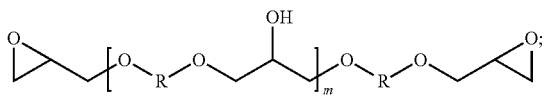

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present invention.

In another aspect, epoxy novolac resins, which are the glycidyl ethers of novolac resins, can be used as multifunctional epoxy resins in accordance with the present invention. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products ranges from about 450 to 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the prevent invention. In another aspect the multifunctional epoxy resin has an EEW in a range from about 170 to about 250.

Depending upon the end-use application, it can be beneficial to reduce the viscosity of the compositions of the present invention by modifying the epoxy component. For example, the viscosity can be reduced to allow an increase in the level of pigment in a formulation or composition while still permitting easy application, or to allow the use of a higher molecular weight epoxy resin. Thus, it is within the scope of the present invention for the epoxy component, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, $C_4$ to $C_{14}$ alcohols, and the like, or combinations thereof. The multifunctional epoxy resin can also be present in a solution or emulsion, with the diluent being water, an organic solvent, or a mixture thereof.

In a further aspect of the invention, the inventive product is employed as an accelerator along with a curing agent. While any suitable curing agent can be employed, examples of suitable curing agents comprise dicyandiamides and an acid anhydride.

The ratio of inventive curing agent to epoxy can range from about 0.3 to 50 parts by weight of the curing agent or accelerator to 100 parts by weight of the epoxy resin.

The inventive curing agents can be employed for crosslinking or curing heat cured epoxy systems for use in one-component heat cured liquid, paste and film adhesives, coatings including powder coatings, prepreg for composites, among other suitable uses.

While any suitable time and temperature can be used for curing epoxy containing compositions, it is desirable to cure the compositions at a temperature ranging from about 80° C. to about 240° C., with cure temperatures of about 120° C. to about 160° C. are useful.

Compositions of the present invention can be used in various applications. Depending on the requirements for the end-use application, various additives can be employed in the formulations and compositions to tailor specific properties. These additives include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof. If desired, the inventive composition can be employed as a curing agent or an accelerator. It is understood that other mixtures or materials that are known in the art can be included in the compositions or formulations and are within the scope of the present invention.

The following Examples are provided to illustrate certain aspects of the invention and shall not limit the scope of the claims appended hereto.

The materials used in the following examples:

N'-(3-dimethylaminopropyl)-N,N-dimethyl-propane-1,3-diamine—Polycat®15 catalyst from Air Products and Chemicals, Inc.

Poly (N-methyl) azetidine—from Air Products and Chemicals, Inc.

Epon 828 and Epon 834—from Hexion

Cab-O-Sil M-5 from Cabot

CTBN/Epon 8282 adduct (HyPox RA1340) from CVC

Phenolic resin—(AlNovol PN320) from Cytec Specialty Chemicals

Example 1

378 gms of N'-(3-dimethylaminopropyl)-N,N-dimethyl-propane-1,3-diamine are charged to a three liters four-neck glass vessel equipped with a mechanical stirrer, a thermocouple, an electric heating mantle, and a nitrogen purge. The vessel is heated to 80° C. under nitrogen. Once the temperature stabilizes, 189.7 gms of Epon 828 is metered in over 2-3 hours. The mixture is held at 80° for 2 hours after the addition is complete. The temperature is slowly raised to 150-160° C. over 20 minutes and 735 gms of phenolic resin is added over 60-90 minutes. The mixture is kept at 160° C. with stirring for an additional hour.

The product is poured off the reactor at the above temperature and allowed to cool to ambient before starting the grinding process. The product is ground by first being broken in small pieces, then ground with a coffee grinder and finally jet milled to the desired particle size.

Example 2

9 gms of Poly (N-methyl) azetidine are charged to a three liters four-neck glass vessel equipped with a mechanical stirrer, a thermocouple, an electric heating mantle, and a nitrogen purge. The vessel is heated to 80° C. under nitrogen. Once the temperature stabilizes, 10.1 gms of Epon 828 is metered in over 2-3 hours. The mixture is held at 80° for 2 hours after the addition is complete. The temperature is slowly raised to 150-160° C. over 20 minutes and 17 gms of phenolic resin is added over 60-90 minutes. The mixture is kept at 160° C. with stirring for an additional hour. The product is poured off the reactor at the above temperature and allowed to cool to ambient before starting the grinding process.

Example 3

9 gms of Poly (N-methyl) azetidine are charged to a three liters four-neck glass vessel equipped with a mechanical stirrer, a thermocouple, an electric heating mantle, and a nitrogen purge. The vessel is heated to 80° C. under nitrogen. Once the temperature stabilizes, 10.1 gms of Epon 834 is metered in over 2-3 hours. The mixture is held at 80° for 2 hours after the addition is complete. The temperature is slowly raised to 150-160° C. over 20 minutes and 9 gms of phenolic resin is added over 60-90 minutes. The mixture is kept at 160° C. with stirring for an additional hour. The product is poured off the reactor at the above temperature and allowed to cool to ambient before starting the grinding process.

Examples 1-3 were tested by differential scanning calorimeter (DSC) for their cure profile as epoxy curing agents. The epoxy formulation comprised polyglycidyl ether of Bisphenol A resin (Epon 828), 5 phr (wt parts per 100 parts resin) of the accelerator and 6 phr of dicyandiamide as the curing agent. The resulting mixtures were blended thoroughly for 2 minutes using a high sheer cowls blade mixer. Immediately after preparation the mixtures were examined by DSC to determine the onset temperature, the peak exotherm, the heat of reaction and the glass transition temperature (Tg). The DSC analysis was performed using a 10° C./min ramp heat rate on about a 10 to 15 mg sample of material. The resulting data is shown in Table 1.

TABLE 1

| | Example 1 | Example 2 | Example 3 |
|---|---|---|---|
| Onset (° C.) | 130 | 145 | 129 |
| Peak (° C.) | 154 | 158 | 152 |
| Heat of reaction (J/g) | 296 | 331 | 283 |
| Tg (° C.) | 132 | 128 | 128 |

Latency, or pot-life, of Examples 1, 2, as an accelerator were studied at 25° C. and at 40° C. using an epoxy formulation that comprised polyglycidyl ether of Bisphenol A resin (Epon 828), 5 phr of the accelerator, 6 phr of dicyandiamide as the curing agent and 1% fumed silica. The resulting mixtures were blended thoroughly for 2 minutes using a high sheer cowls blade mixer, cooled to 25° C. and the initial viscosity was measured using a Brookfield viscometer. The samples were stored at 25° C. and the viscosities changes measured over time. The resulting data is presented in Table 2.

TABLE 2

| | Example 1 | Example 2 | Example 3 |
|---|---|---|---|
| Pot-life (25° C.) | >1 year | >1 year | >1 year |

Lap Shear and Peel strength were tested in a rubber modified formulation by ASTM standard tests D1002 and D1876 with 1"×4"E-coated CRS coupon, 0.5" overlap, 10 mils bond line thickness and a cure 10' @ 150° C. metal temperature. The epoxy formulation comprised of 77.5 grams of polyglycidyl ether of Bisphenol A resin (Epon 828), 37.5 grams of CTBN/Epon 828 adduct, 6 grams of Amicure CG1200G, 5 grams of Examples 1-3, and 2 grams of Cab-O-Sil M-5. The resulting data is presented in Table 3.

TABLE 3

| | Example 1 | Example 2 | Example 3 |
|---|---|---|---|
| Lap Shear (psi) | 2600 | 1159 | 1762 |
| T-Peel | 16 | 7 | 10 |

The invention claimed is:

1. A composition comprising (i) a reaction product of (a) a phenolic resin of general formula (A):

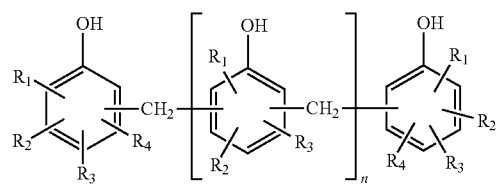

where $R_1$, $R_2$, $R_3$, $R_4$ are each independently, of one another, a hydrogen or unbranched or branched alkyl group having 1 to 17 carbon atoms, and n is an integer from 0 to 50; and (b) an adduct of an epoxy resin and a polyalkylenepolyamine having one primary or secondary amine and at least two tertiary amines of the general formula (B):

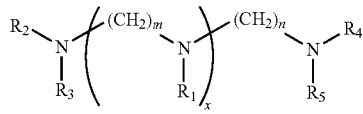

$R_1$, $R_2$, $R_3$, $R_4$ and $R_5$ are hydrogen, methyl or ethyl; n and m independently are integers from 1 to 10; and X is an integer from 1 to 10; (ii) at least one member selected from the group consisting of dicyandiamides and acid anhydrides and (iii) at least one epoxy resin; wherein the composition has a curing temperature of about 80 to about 240 C and a pot life at 25 C of greater than one year.

2. The composition of claim 1 wherein the epoxy resin of (iii) comprises at least one member selected from the group consisting of multifunctional epoxy resins, the glycidyl ethers of polyhydric phenols, glycidyl ethers of dihydric phenols, glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane, and bis-(4-hydroxyphenyl)-methane.

3. The composition of claim 1 wherein the epoxy resin of (iii) has the following structure:

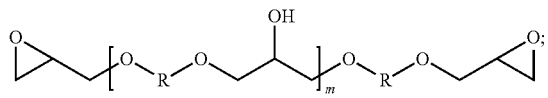

where m is an integer, and R is a divalent hydrocarbon radical of a dihydric phenol.

4. The composition of claim 2 wherein multifunctional epoxy resin comprises the glycidyl ethers of novolac resins.

5. The composition of claim 2 wherein the multifunctional epoxy resin comprises at least one member selected from the group consisting of a diglycidyl ether of bisphenol A a diglycidyl ether of bisphenol-F, an epoxy novolac resin, or any combination thereof.

6. The composition of claim 2 wherein the multifunctional epoxy resin further comprises at least one member selected from the group consisting of styrene oxide, cyclohexene oxide, ethylene oxide, propylene oxide, butylene oxide, the glycidyl ethers of phenol, cresols, tert-butylphenol, other alkyl phenols, butanol, 2-ethylhexanol, $C_4$ to $C_{14}$ alcohols, and combinations thereof.

7. The composition of claim 1 wherein the adduct comprises an adduct of an epoxy resin and poly(N-methyl)azetidine.

8. The composition of claim 1 wherein the adduct comprises an adduct of an epoxy resin and N'-(3-dimethylaminopropyl)-N,N-dimethyl-propane-1,3-diamine.

9. The composition of claim 1 wherein the epoxy resin comprises polyglycidyl ether of Bisphenol A resin.

10. The composition of claim 1 wherein formula (B) comprises a compound wherein $R_1$ is H, $R_{2,3,4}$ and $_5$ are $CH_3$, n and m are 3, and X is 1.

11. The composition of claim 1 wherein the composition comprises dicyandiamides.

12. The composition of claim 1 wherein the ratio of reaction product to epoxy resin of (iii) is about 0.3 to about 50 parts by weight reaction product to about 100 parts by weight epoxy resin.

13. The composition of claim 1 wherein the composition comprises acid anhydrides.

14. A composition comprising; (i) the reaction product of (a) an adduct of poly(N-methyl)azetidine and an epoxy resin, and (b) a phenolic resin, (ii) at least one member selected from the group consisting of dicyandiamides and acid anhydrides and (iii) at least one epoxy resin; wherein the composition has a curing temperature of about 80 to about 240 C and a pot life at 25 C of greater than one year.

15. A composition comprising: (i) the reaction product of (a) an adduct of N'-(3-dimethylaminopropyl)-N,N-dimethyl-propane-1,3-diamine and an epoxy resin, and (b) a phenolic resin; (ii) at least one member selected from the group consisting of dicyandiamides and acid anhydrides and (iii) at least one epoxy resin; wherein the composition has a curing temperature of about 80 to about 240 C.

16. A composition comprising: (i) the reaction product of: (a) a phenolic resin of general formula (A):

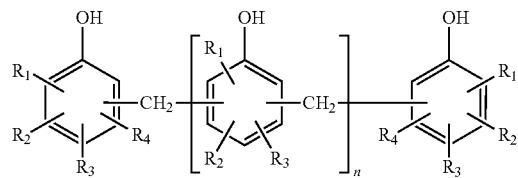

where $R_1$, $R_2$, $R_3$, $R_4$ are each independently, of one another, a hydrogen or unbranched or branched alky group having 1 to 17 carbon atoms, and n is an integer from 0 to 50; and (b) an adduct of an epoxy resin and a polyalkylenepolyamine having one primary or secondary amine and at least two tertiary amines of the general formula (B):

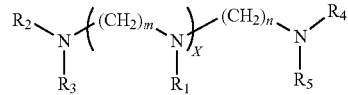

$R_1$ is H; $R_2$, $R_3$, $R_4$ and $R_5$ are methyl or ethyl; n and m independently are integers from 1 to 10; and X is an integer from 1 to 10, (ii) at least one member selected from the group consisting of dicyandiamides and acid anhydrides and (iii) at least one epoxy resin; wherein the composition has a curing temperature of about 80 to about 240 C.

17. The composition of claim 16 wherein the epoxy resin of (iii) has the following structure:

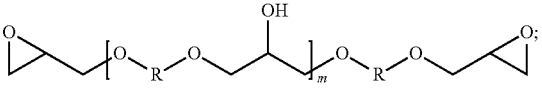

where m is an integer, and R is a divalent hydrocarbon radical of a dihydric phenol.

* * * * *